(12) United States Patent
Antonelli et al.

(10) Patent No.: US 6,813,218 B1
(45) Date of Patent: Nov. 2, 2004

(54) BUOYANT DEVICE FOR BI-DIRECTIONAL ACOUSTO-OPTIC SIGNAL TRANSFER ACROSS THE AIR-WATER INTERFACE

(75) Inventors: Lynn T. Antonelli, Cranston, RI (US); Fletcher Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/679,680

(22) Filed: Oct. 6, 2003

(51) Int. Cl.$^7$ .................................................. H04B 1/59
(52) U.S. Cl. ............................................. 367/3; 367/134
(58) Field of Search ..................................... 367/3, 134

(56) References Cited

U.S. PATENT DOCUMENTS 5,060,206 A * 10/1991 DeMetz, Sr. .................. 367/3
6,058,071 A * 5/2000 Woodall et al. ................ 367/3

* cited by examiner

Primary Examiner—Daniel Pihulic
(74) Attorney, Agent, or Firm—James M. Kasischke; Michael F. Oglo; Jean-Paul A. Nasser

(57) ABSTRACT

A buoy system bi-directionally communicates in-air and underwater. A buoy having a shell to float on water has an upper portion in air and a lower portion in water. An array of acoustic transducers which is disposed in the lower portion receives acoustic signals and transmits acoustic signals. A dome-shaped retro-reflective coating on the upper portion is vibrated for retro-reflecting impinging laser illumination as data signals in air. An array of photo-detectors on the upper portion are responsive to impinging laser control signals and/or signals which may be transmitted as acoustic signals in water.

12 Claims, 1 Drawing Sheet

BUOYANT DEVICE FOR BI-DIRECTIONAL ACOUSTO-OPTIC SIGNAL TRANSFER ACROSS THE AIR-WATER INTERFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to an improvement for communicating across the air-water interface. More particularly, the invention relates to a cost-effective buoy system responsive to in-air laser beams and underwater acoustic transducers receiving and transmitting acoustic signals for bi-directional transfer of information between in-air and underwater environments.

(2) Description of the Prior Art

Effective bi-directional transfer of information between in-air and underwater platforms has been long sought since such a capability would increase the autonomy and flexibility of subsurface, surface, and air vehicles engaged in undersea warfare. However, signal transfer by contemporary communications systems has been complicated by the fact that efficient in-air signal propagation is accomplished through radio frequency (RF) transmissions while acoustic pressure waves are the most efficient means underwater. Unfortunately, RF signals do not penetrate or propagate well in water, and underwater generated acoustic signals do not readily penetrate into the air environment. Optical signals, such as laser beams can operate in both air and water environments; however, their depth range in water is limited by water clarity (signal attenuation) to typically within one hundred meters or less.

Consequently, the primary method of underwater sonar and communications relies on acoustic signal generation and propagation through the water using submerged acoustic transmission hardware.

The generation of underwater sound from an aerial platform therefore poses a challenge. Active surface ship sonar and aerial dipping sonar devices such as disclosed in U.S. Pat. No. 5,856,954 could be used for this purpose at the risk of the transmitting platform giving away its position.

Optical signals from lasers have been found to propagate well in air (depending on environmental conditions such as fog or rain) and are more covert than RF transmissions due to their confined beam width, and an opto-acoustic communication system has been developed that takes advantage of this. The opto-acoustic system (technique) provides a method for transmitting an acoustic waveform from an in-air platform into the water via conversion of optical energy at and/or slightly below the air-water interface. In the linear regime of opto-acoustics, a laser beam incident at the boundary is exponentially attenuated by the medium thus producing local temperature fluctuations that give rise to volume expansion and contraction. The volume fluctuations in turn generate a propagating pressure wave. The effect of the medium's attenuation on the laser light is to produce an array-like structure of thermo-acoustic sources that generate modulated pressure waves at the laser amplitude and modulation frequency of the modulating laser signals. In the non-linear regime of opto-acoustics, the types of physical phenomena that are produced are based on optical energy density and intensity considerations. Broadband acoustic transients with considerable acoustic energy are created in the water. The laser pulse repetition rate can also be used to transmit selected acoustic frequencies for sonar, command and control, and communications purposes. For example, this approach can control steering of unmanned underwater vehicles (UUVs) and torpedoes.

A level of covertness and safety can be obtained using an opto-acoustic system that has been devised to remotely generate underwater acoustic signals. Sound Pressure Levels (SPL) of up to 200 dB//$\mu$Pa have been achieved by directing a focused, high-powered, infrared, pulsed laser beam onto the water surface. The effect of the high energy/intensity laser incident at the water's surface is to produce a change in the phase of the water medium from water to vapor and/or plasma producing an explosive, thermo-acoustic source that generates modulated pressure waves at the laser amplitude and modulation frequency of the modulating laser signals. The remote nature of the aerial source insures that the source of the underwater acoustic transmission remains unknown to underwater platforms. Likewise, the in-air optical signal used for generating an underwater acoustic signal remains covert to in-air platforms. This method provides a means for remote, aerial generation of underwater sound, breaching the air-water interface.

However, the opto-acoustic technique requires high power pulsed lasers and focusing optics for efficient conversion of optical to thermo-acoustic energy. Also, the performance of the opto-acoustic conversion is affected by the oblique laser incidence angle at the air-water boundary, sea state roughness, and by in-water impurities.

Due to the large acoustic impedance mismatch between the air and water environments, underwater acoustic signals do not significantly penetrate into the air. Traditionally, underwater acoustic sonar requires in-water hardware for acoustic signal generation and reception. This alone makes it difficult to acoustically communicate across the air-water interface between underwater platforms such as UUVs and submarines and surface platforms from ships, unmanned aerial vehicles (UAVs), aircraft, ground based platforms and satellites. Thus, buoys were designed to receive underwater acoustic signals via underwater propagation or propagation through a direct tethered link and then reradiate the information as Radio Frequency (RF) signals into the air for subsequent detection by land or air-based platforms, see for example U.S. Pat. Nos. 6,058,071 and 5,592,156. Typically, RF signals broadcast to a large area for data reception. This is advantageous in that RF signals can be detected at great distances and relayed through satellites. However, the process is less covert and can lead to unwanted signal interception.

An alternative, the laser Doppler vibrometer (LDV) detection method had been devised to detect underwater acoustic signals by directly probing the water surface with a laser beam. This method is used for detecting acoustic signals by measuring velocity perturbations (vibrations) derived from the sound pressure at the surface of the water, and this capability may be applied to uplink communications between underwater and in-air platforms as well as aerial detection of any underwater sound for applications including marine mammal detection and tracking, and defense of surface ships from wake homing torpedoes. The LDV provides a means for covert and remote, aerial detection of underwater sound, breaching the air-water interface.

However, applying a commercial LDV involves obtaining narrow beam laser returns from the specularly reflecting water surface. Initial tests on hydrodynamic surfaces indicate that signal dropout occurs due to optical reflections arriving outside of the optical detector's sensing area. Signal information is therefore lost intermittently and randomly, which is a detriment especially for communications applications. Irrespective of the performance of the LDV-based sensor improves with higher optical reflectivity, the air-water interface reflects only approximately 2% of the incident laser radiation and therefore limits the efficiency of this application of LDV sensors.

Thus, in accordance with this inventive concept, a need has been recognized in the state of the art for a buoyant device that enables optically controlled, bi-directional transfer of underwater sound between in-air and underwater environments that assures covert in-air operations using spatially confined, low-powered laser beams for triggering underwater transmission and for optically detecting the underwater sound.

SUMMARY OF THE INVENTION

The first object of the invention is to provide a buoy device for covertly, optically controlling, bi-directional transfer of underwater sound and optical laser signals between in-air and underwater environments.

Another object of the invention is to provide a buoy system for both translating in-air optical signals to underwater acoustic signals and translating underwater acoustic signals to optical signals transmitted through air for remote, optical reception.

Another object is to provide a cost-effective buoy to remotely generate underwater sound of known spectral content, amplitude, and phase and enhance aerial, optical detection of the underwater sound.

Another object is to provide a buoy using spatially confined, low-powered laser beams for triggering underwater transmission and optical detection of underwater sound.

Another object is to provide a buoy system using in-air laser beams and underwater acoustic transducers for bi-directional transfer of information between in-air and underwater environments.

Another object is to provide a buoy system using in-air laser beams and underwater acoustic transducers for bi-directional transfer of information between in-air and underwater environments for uplink and downlink communications and control of vehicles such as UUVs and torpedoes across the air-water interface.

Another object is to provide a buoy system using in-air laser beams and underwater acoustic transducers for bi-directional transfer of information between in-air and underwater environments that reduces laser power requirements and the difficulties associated with direct opto-acoustic conversion while maintaining in-air covert operation and remote access to the transmitting buoy.

Another object is to provide a buoy system enhancing the optical reflectivity and sensitivity for the acousto-optic (LDV-based) sensing technique while maintaining covert and remote, aerial access of underwater acoustic signal information.

Another object is to provide a buoy operating in an active mode by accepting a low-power laser beam delivering a signal through the air from a remote source to activate the buoy's underwater acoustic transmitter.

Another object is to provide a buoy operating in the passive mode to detect underwater sound with underwater acoustic transducers and translate the detected sound into amplified vibrations that are probed by laser signals from a remote LDV sensor to allow retrieval of the detected underwater sound.

These and other objects of the invention will become more readily apparent from the ensuing specification when taken in conjunction with the appended claims.

Accordingly, the present invention is for a buoy system for bi-directional communications in-air and underwater. A hollow shell of a buoy floating on water has an upper portion in air above the surface of water and a lower portion below the surface of the water. An array of acoustic transducers is disposed in the lower portion for receiving acoustic signals and for transmitting acoustic signals through the water. A dome-shaped retro-reflective coating on the upper portion is vibrated in accordance with acoustic or other gathered information bearing data signals for retro-reflecting impinging laser illumination signals through air and conveying the acoustic and other information bearing data signals as retro-reflected data signals in air. The retro-reflective coating is controlled to vibrate in response to impinging laser control signals through air and an array of photo-detectors on the upper portion of the buoy are responsive to the impinging laser control and information signals. A control/memory/GPS module and acoustic processing-electronics section in the shell receives activation signals from the retro-reflective coating and photo-detector array and couples received acoustic signals from the transducer array and from memory as data signals to the retro-reflective coating. An array of electromechanical vibration shakers inside of and against the upper portion of the shell is driven by the optic-processing module for vibrating the retro-reflective coating, and an annular array of accelerometers is connected to the optic-processing module to monitor vibratory motion of the retro-reflective coating. Transducer elements are interspersed with the vibration shaker array under the dome-shaped retro-reflective coating. The transducer elements are connected to the optic processing module for generating signals representative of the impinging laser control and information signals. The representative generated signals from the transducer elements are coupled to the control/memory/GPS module to initiate retrieval of the information of received acoustic signals from the transducer array and memory in the control/memory/GPS module. A transmit/receive switch is connected to the control/memory/GPS module, acoustic processing-electronics section, and the transducer array to selectively enable operation of the transducer array in the passive mode and the active mode. A remote platform has at least one laser onboard for transmitting the impinging laser illumination signals and impinging laser control signals through the air. The remote platform also has a laser Doppler vibrometer-based sensor responsive to receive the data signals as the retro-reflected data signals through the air.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein:

The FIGURE is a schematic cross-sectional representation of the buoy system of the invention for covertly bi-directionally translating in-air optical signals and underwater acoustic signals.

DESCRIPTION OF THE PREFERRED EMBODIMENTS

Figure 1:
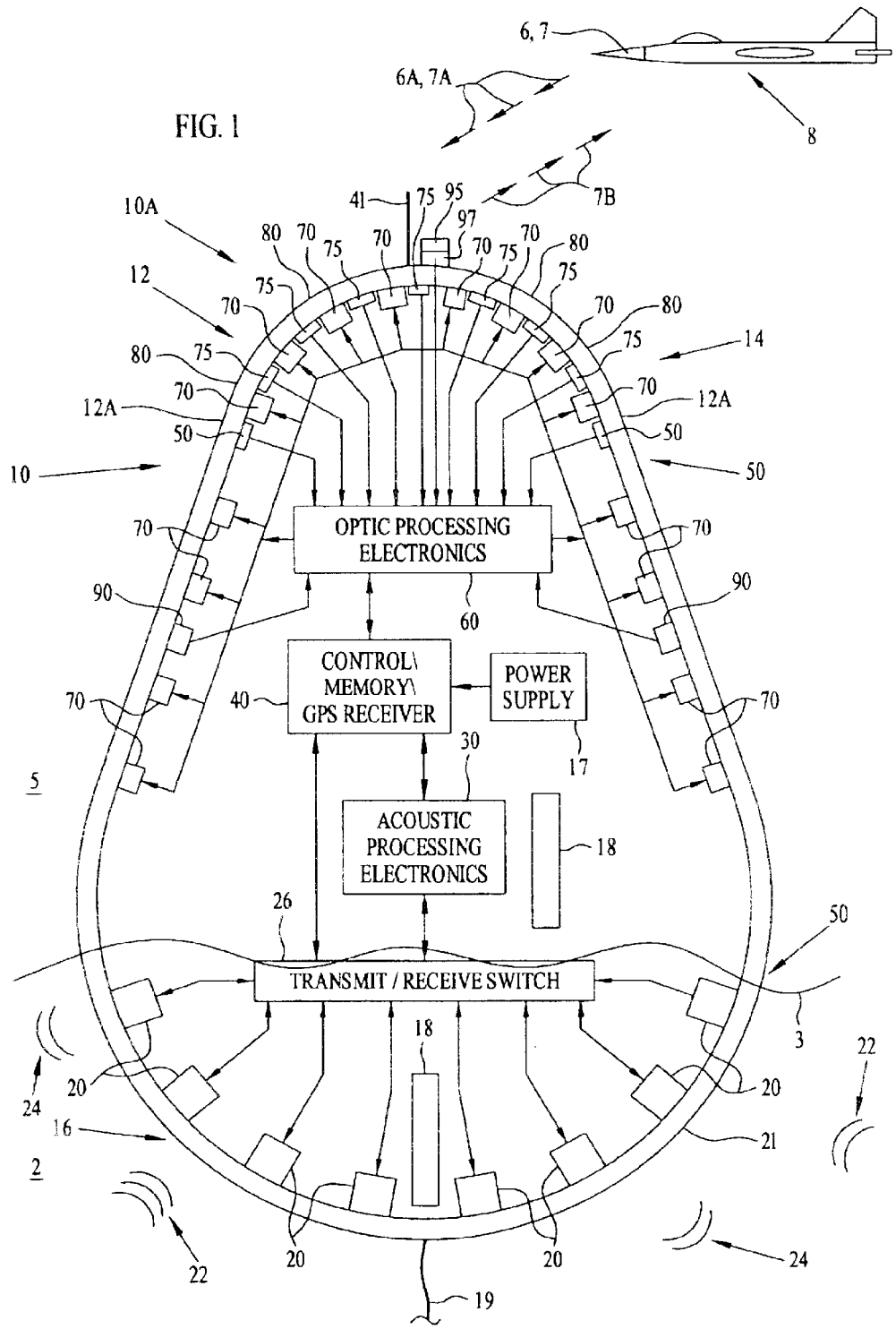

Referring to the FIGURE, buoy system 10 of the invention has a buoy 10A operationally deployed as it floats on water 2. Buoy 10A has a hermetically sealed metal outer shell 12 to assure that an upwardly extending dry-side portion 14 projects upwardly above waterline 3 into surrounding air 5 and a lower wet-side portion 16 extends into water 2. Metal outer shell 12 could be a flexible, inflatable structure that may resist radar reflections for further covertness. Buoy 10A has a centrally located power supply 17 for supplying electrical power to all its components to be described that need electrical power, and suitable ballast chambers 18 are schematically shown for maintaining buoyancy and proper vertical orientation. Power supply 17 is most likely to be batteries, but solar energy receptor/converters might be used as well as a converter of kinetic energy from ocean waves. An anchor line 19 can be connected to lower portion 16 and extend to an anchor (not shown) on the bottom when mooring is desirable.

Lower portion 16 has a nearly hemispherically-disposed array of acoustic transducers 20 inside of shell 12 of lower portion 16. Lower portion 16 also has a protective acoustically transparent cover 21 to allow bi-directional transfer of acoustic energy signals 22, 24 by transducer array 20. That is, transducer array 20 covered by protective, acoustically transparent cover 21 is capable of both detection of impinging acoustic signals 22 and transmission of projected acoustic signals 24. The bi-directional transfer of signals 22, 24 is controlled by transmit/receive switch 26 connected to transducer array 20. Switch 26 can control transducer array 20 to operate in the passive mode and receive impinging acoustic signals 22 from distant signal sources of interest through water medium 2, or operate in the active mode to transmit acoustic signals 24 through water medium 2. Acoustic processing-electronics section 30 and control/memory/GPS module 40 in upper portion 14 are connected to operate transmit/receive switch 24 and transducer array 20.

Upper portion 14 has an annular array of photo-detectors 50 on shell 12 exposed through small transparent sealed windows 12A in shell 12 to receive remote optical signals transmitted through air 5 and connect activation signals to an optic-processing module 60. Optical processing module 60 also is connected to control/memory/GPS module 40 and an array of electromechanical vibration shakers 70 that extend around and down the inside of upper portion 14 of shell 12. Electro-mechanical vibration shakers 70 are driven by optic-processing module 60 to responsively vibrate a dome-shaped retro-reflective coating 80 on upper portion 14, and an annular array of accelerometers 90 is connected to optic-processing module 60 to allow monitoring of the vibratory motion of retro-reflective coating 80.

Low-power laser beams (shown as arrows 6A) can be transmitted from a remote laser source 6 on a remote platform 8 of buoy system 10, such as an aircraft or land-based platform. Laser beams 6A are directed at buoy 10 A where they can be detected by photo-detector array 50 on upper portion 14 of buoy 10A. Since photo-detector array 50 annularly extends about shell 12, it can receive and capture the control and other information of laser beam 6A from all directions around shell 12 and couple it to optical processing electronics module 60. Optical processing electronics module 60 inside upper portion 14 generates signals representative of activation signals from laser signals 6A for operation of buoy system 10. These activation signals can be representative of control commands and/or information of laser signals 6A such as to control transducer array 20 to receive acoustic signals 22 or transmit the information of laser beam 6A as acoustic signals 24 into water 2. Laser beam signals 6A could also be used for other control of components of buoy 10A. Thus, since laser beam 6A is narrow and does not "spill-over" to other areas and be intercepted, laser beam 6A can be used for covert remote control or activation of transducer array 20.

When the buoy 10A is deployed on water 2, transducer array 20 is submerged and outwardly facing in water 2 for efficient acoustic reception and transmission of the underwater sound signals 22, 24. Transducer array 20 of buoy system 10 can be switched between active (projection) and passive (detection) modes in response to remote control signals of beam 6A via transmit/receive switch 26. The transmit/receive switch 26 appropriate signals representative of laser signals 6A from interconnected electronics module 60 via control/memory/GPS module 40 and the acoustic processing-electronics section 30. Control/memory/GPS module 40 of buoy 10A has an internal memory storage such that acoustic signals can be collected, stored, and then delivered into the water 2 at a precise time (or delay) as designated by remotely originating optical command signals 6A. Memory of module 40 can also store the information of laser beam signals 6A for later acoustic transmission by transducer array 20 after a predetermined delay or when a subsequent laser signal 6A controls such transmission. In addition, control/memory/GPS module 40 has Global Positioning System (GPS) for covert identification of buoy position by host platform (remote platform 8). GPS is located in Control/memory/GPS module 40 and is appropriately connected to an antenna 41 on shell 12 to receive GPS coordinates and, optionally, to relay the position of buoy 10A to remote platform 8. A capability for electromagnetically transmitting the location of buoy system 10 to host platform 8 via antenna 41 may also be included; however, such transmissions may be more susceptible to unwanted interception. This relay of information might also be done by appropriate coded vibrations of retro-reflective coating 70 after an interrogation command for the buoy's location has been received at buoy 10A via laser signal 6A or by laser signal 7A.

The acoustic processing-electronics section 30 of buoy 10A is internally connected to receive acoustic signals from acoustic transducers 20 and photo-detector array 50 via optic processing-electronics module 60 and control/memory/GPS receiver module 40. This information is to be used for deciphering remote control signals optically detected by photo-detector array 50, and for processing passive acousto-optic signals and active opto-acoustic signal information for responsive operation of buoy 10A.

Buoy 10A also can be remotely controlled to detect impinging acoustic signals 22 through water 2 in a passive mode by underwater acoustic transducers 20. Signals representative of monitored acoustic signals 22 can be stored into system memory in control/memory/GPS module 40 or can be transferred immediately for responsive operation of other components of buoy system 10 as dictated by remote control commands in laser beam 6A. Immediate transfer of data is accomplished by translating the representative signals of the detected acoustic signals 22 into representative amplified vibrations of dome-shaped retro-reflective coating 80. The vibrations of retro-reflective coating 80 are excited by electromechanical vibration shaker array 70 that has its aggregate vibrating surface coupled to the inner side of upper portion 14 of metal shell 12.

An external, low-power laser Doppler vibrometer-based sensor 9 on remote platform 8 would then probe retro-reflective coating 80 on upper portion 14 of shell 12. This is done by transmitting a low-power illuminating beam 7A from laser 7 on platform 8 to impinge upon the now vibrating retro-reflective coating 80 on shell 12, and then sensing a retro-reflected laser beam portion 7B of illuminating laser beam 7A in system 9 on platform 8. That is, reflected portion 7B would be retro-reflected from retro-reflective coating 80 to laser Doppler vibrometer-based sensor 9, and the information content of the vibrations of retro-reflective coating 80 would be in reflected portions 7B to remotely retrieve the detected underwater sound of signals 22 at platform 8. Vibrometer-based sensor 9 could be a Model OFV-353 Doppler vibrometer developed and marketed by Polytec PI of 23 Midstate Drive, Auburn, Mass. 01501, Polytec PI, for example.

The term illuminating as used herein is not intended to mean that laser beam 7A or reflected portion 7B is necessarily visible to the eye, but it can be in a variety of different wavelengths emitted by lasers to achieve the desired vibrations of retro-reflective coating 80 and retro-reflections as discussed herein. In addition the mere receipt of illuminating laser beam 7A at photo-detector array 50 may be used to control or trigger the activation of vibration shaker array 70 to vibrate retro-reflective coating 80 and create retro-reflected signals 7B.

The information content of the reflected signals 7B sensed by sensor 9 is enhanced by buoy 10A of the invention in comparison to the quality of the sensed signals of the acousto-optic sensing technique using high-power laser energy as discussed in the prior art technique in the Background supra. Retro-reflective coating 80 on shell 12 of buoy 10A provides an enhanced in-air optical reflection for subsequent signal acquisition by the external, remote, laser vibrometer sensor 9 on remote platform 8. Buoy 10A of the invention enhances the in-air detection performance of external sensor 9 with respect to increasing sensitivity of acoustic detection and maintains a high probability of reflection for reduced signal dropout. This enhanced capability is achieved with relatively low power illuminating laser signals 7A in buoy system 10 as compared to the technique of the prior art.

Buoy 10A can operate in an active mode when low-power laser beam 6A is transmitted through air 5 from laser 6 on remote platform 8 to buoy 10A for controlling or activating transducer array 20 to transmit acoustic signals 24 and receive reflected acoustic signals 22. Photo-detector array 50 is open through transparent windows 12A to air environment 5 to receive laser beam signals 6A and generate activation signals for optic processing-electronics module 60 that processes the optical signal and responsively activates transducer array 20 via control/memory/GPS receiver module 40. In response to remote command signals 6A, buoy system 10 provides opto-acoustic transduction remotely and covertly at low cost for easier and more effective implementation of a laser-based aerial transmission of what will be underwater sound. The information of laser beam signal 6A is transmitted at sufficient low-power from platform 8 to get to and control operations of buoy system 10. This feature eliminates any need for airborne high-power lasers for thermo-acoustic interaction at the water's surface.

Since the upper portion 14 of shell 12 has dome-shaped retro-reflective coating 80 exposed to and positioned in air environment 5, buoy 10A also may be optically probed by illuminating laser beam 7A from a laser 7 on platform 8 to acquire underwater acoustic information 22 that is being and has been acquired by transducer array 20 and stored in control/memory/GPS module 40. The optical energy of narrow low-power illuminating laser beam 7A can cause vibrations of retro-reflective coating 80 that are transmitted through metal shell 12 and to transducer elements 75 that are interspersed with individual shakers of vibration shaker array 70 under dome-shaped retro-reflective coating 80. Transducer elements 75 could be piezoelectric chips connected to optical processing module 60 that generate activation signals representative of the information (that could be control signals) of impinging laser beams 7A. The representative activation signals are coupled to control/memory/GPS module 40 and may initiate the retrieval of the information of received acoustic signals 22 that has been stored in module 40 or being currently received by transducer array 20. This control by beam 7A can be in place of control by laser beam 6A if desired.

The information of received acoustic signals 22 will be retrieved by optical processing-electronics module 60 from control/memory/GPS module 40 and coupled to vibration shaker array 90. Vibration shaker array 70 generates vibrations of upper portion 14 of shell 12 and retro-reflective coating 80 that are representative of the received acoustic signals 22.

Since retro-reflective coating 80 is matched to wavelengths of emissions from remote platform 8, it can retro-reflect laser beam portions 7B of illuminating laser beam 7A that impinge on it. Consequently, the representative vibrations of retro-reflective coating 80 responsively modulate reflected portions 7B which are received by vibrometer-based sensor 9 which can determine the information content of portions 7B. The retro-reflected portions 7B thusly can carry the information of presently acquired acoustic signals 22, or any other stored information in control/memory/GPS module 40.

Thus, retro-reflective coating 80 provides a mechanical means of maintaining the optical reflectivity and enhancing acousto-optic sensitivity for the remote LDV sensing technique. These capabilities improve sensor performance while maintaining covert and remote information access. The buoy's high reflectivity enhances the LDV sensor's optical data reception for continuous data acquisition to reduce the signal dropout which otherwise occurs with surface wave interaction with the high-power interrogating laser beam of the prior art.

Optical processing of data in buoy system 10 can be done by electronic components of buoy system 10 for operation in the passive mode. Buoy system 10 can process detected acoustic signals 22 and convert them to responsive amplified vibrations of the upper portion 14 of buoy shell 12 and retro-reflective coating 80. Optic processing-electronics module 60 has a means for acquisition and amplification of acoustic signals 22 from transducer array 20 via control/memory/GPS receiver module 40. Control module 40 will interpret optically received control signals 6A from photo-detector array 40, control the activation of optic processing module 60 and acoustic processing electronics section 30, provide memory storage capability within it, contain a GPS receiver capability within it, control the activation of transmit/receive switch 26 and operational mode of transducer array 20. Detected signals 22 can be amplified by acoustic processing-electronics section 30 and sent to optical processing module 60 and coupled to vibration shaker array 70 for generating vibrations of upper portion 14 and retro-reflective coating 80 on shell that are representative of detected underwater acoustic signals 22 that can be retrieved by remote platform 8 when a narrow-beam interrogation signal 7A impinges on retro-reflective coating 80. Whenever retro-reflective coating 80 is activated to transmit information, annular accelerometer array 90 on buoy shell 12 can monitor vibrations imparted by vibration shaker array 70 to assure the accuracy and validity of information of optically transmitted (retro-reflected) beam 7B when a comparison is made in optic processing module 60 to the intended vibrations of retro-reflective coating 80.

Optical processing of data in buoy system 10 can be done by buoy system 10 for operation in the active mode. Buoy system 10 can process detected optical signals 6A and convert them to an amplified underwater acoustic transmission signal 24. Optical processing-electronics module 60 is coupled to photo-detector array 50 to acquire signal 6A. Detected signal 6A is passed to control/memory/GPS module 40 and fed to acoustic processing electronics section 30 to create an amplified signal to initiate transmission of acoustic signal 24 by array 50 into water 2.

The uncomplicated design of buoy 10A is the first of its kind for translating in-air optical signals of a laser beam to underwater acoustic signals as well as for translating underwater acoustic signals for remote, optical reception of retro-reflected laser signals. The standoff, bi-static sonar technique allows a remote platform 8 of buoy system 10, be it a surface ship or in-air platform or land-based sonar station, to generate acoustic sonar signals at a distance from their controlling (transmitting) platform. The acoustic illumination of the underwater objects can then be detected and analyzed at host platform 8 and used to localize the position of submerged or buried platforms and objects. The active transmissions may also be used to deliver in-air optical signals to underwater sonar communication signals.

In the active mode, buoy system 10 allows the use of low power, information carrying lasers on platforms 8 instead of high powered lasers, for opto-acoustic transmission. Since lower powered lasers can be used to trigger buoy 10A to generate underwater acoustic signals 24, the need for high energy lasers is eliminated which is an order of magnitude improvement over thermo-acoustic physic systems of the prior art for generation of underwater sound. Another advantage over thermo-acoustic systems is that buoy system 10 of the invention avoids stringent optical focusing restrictions for gathering data and the limitations associated with changing sea surface conditions. Consequently, a larger selection of many different lasers can be made in platform 8 of buoy system 10 including lower power levels and different wavelengths of operation that can be used which are safer for the eyes (pilot's concern) and that can reduce the size and weight of the laser systems on distant platforms 8. In addition buoy system 10 can allow use of laser pulse modulation to eliminate the need for high pulse rate, high-power lasers in the infrared wavelength region. Remote transmission of underwater acoustic signals including communication signals and control signals are enabled to allow communications and remote control of UUVs, UAVs, and munitions. Buoy system 10 provides a covert countermeasure capability that also allows in-air covert operation (rather than overt RF signal transmission broadcasts) to control of underwater acoustic transmission. Buoy 10A of buoy system 10 additionally gives an alternative means of generating a sonar signal for underwater object illumination or for downlink underwater communications to a submerged platform. Buoy 10A of buoy system 10 can deliver broadband acoustic signals of desired spectral contents, amplitudes, and phases and is a more controllable underwater sound source than 'Distant Thunder' explosions. Buoy system 10 allows a remote host platform 8, (fitted with the low-power lasers), such as a tower, surface ship or in-air platform to generate acoustic sonar signals from a standoff position that can be used to detect and localize the position of submerged/buried platforms and objects either with their own ship's sonar with an external LDV sensor. Buoy 10A of buoy system 10 can provide an explosive/chemical payload delivery system for smart mine and counter mine applications, can have a propulsive system to move it and possibly avoid boat traffic or detection, can have adaptive buoyancy in order to raise and lower it, and could have scuttling charges that can be detonated after its usefulness is over. In addition buoy 10A could contain a main charge having sufficient explosive power to inflict damage on an adversary. The buoy system 10 could employ chemical and electromagnetic sensing devices as well as fuel cells to augment its capabilities. Additional small explosive shaped charges could be contained within the buoy.

Buoy system 10 can provide a continuous reflective surface for laser interrogation to detect underwater sound, even when it is subjected to wave motion. Buoy system 10 also provides a standoff, covert method to obtain underwater acoustic sonar information, and a new level of efficient battle-space detection and monitoring can be attained using the combination of several buoys 10A and several remote platforms 8 in buoy system 10 having laser-based sensing (LVD) techniques that can include satellites, lighter-than-air craft, fixed/movable wing, manned/unmanned aircraft, etc. Buoy system 10 enhances the signal to noise ratio of aerial optical detection, and improves LDV sensor detection sensitivity. Besides detecting ambient ocean noises, and marine mammal sounds and shipping noise, buoy 10A may also be used for detecting underwater vessels such as submarines or communications signals from submarines or UUVS. The detected acoustic signals will then be transferred to the upper, air-side portion of buoy system 10 for subsequent aerial detection by remote platform 8.

It is understood that other sizes and configurations of buoy 10A could be made in accordance with this invention to allow successful operation in different operational scenarios. Irrespective of the exact shape of buoy 10A (including an inflatable design), it must provide an underwater section for acoustic reception and transmission, an optically responsive section for translating detected optical signals into appropriate buoy control commands or for activation of the acoustic transmission signal, and an electronics section coupled to each other sections for bi-directionally translating between the acoustic and optical signals. Furthermore, optically retro-reflective coating 80 on shell 12 that is in contact with air 5 can be interlaced with photo-detectors of array 50 in different orientations instead of the annular disposition as discussed above to assure acceptable optical signal reception of laser signals 6A and 7A. Retro-reflective coating 80 and the photo-detector array 50 on upper portion 14 of buoy system 10 should be made to be responsive to the wavelengths of laser radiation 6A and 7A and can be tailored or modified to include many other wavelengths of laser radiation so long as retro-reflective coating 80 is capable of reflecting portions 7B of the other wavelengths of laser radiation. In this regard, optical laser signals 6A, 7A sent to buoy system 10 may contain either the exact waveform to be converted to a transmitted acoustic signal 24 or optical signals 6A, 7A may transfer coded signals to be interpreted by optic-processing module 60 and control/memory/GPS module 40 in buoy system 10 for designation of the signal waveform and/or remote control of operation of buoy system 10.

Transducer array 20 can be different than shown and described and can be controlled to allow broadband acoustic coverage, create beam patterns, and transmit acoustic energy at different power levels. Ballast chambers 18 may be selectively flooded or purged to allow buoy system 10 to sink or rise to a desired depth and transmit different levels of acoustic energy into the water with a reduced, probability of cavitation to remain covert.

Optionally, or in addition to the components described above, buoy 10A also can have an onboard laser 95 with an optical system 97 connected to optic processing module 60. Optical system 97 suitably aims and aligns onboard laser 95 to emit an emitted laser beam 96 to platform 8 to transmit data and/or other information and control signals from buoy 10A to platform 8. For example, optical system 97 for onboard laser 95 could have an appropriately interconnected photo-cell arrangement that senses the direction where an interrogating beam from platform 8 is coming from to point onboard laser 95 in this direction during emission of beam 96. This capability provided by onboard laser 95 can be used as a primary up-link to platform 8 or other designated receiving station or could be used as a back-up for the other aforedescribed components.

One skilled in the art to which this invention applies could make such changes without departing from the scope of this invention herein described. Having this disclosure in mind, modifications calling for selection of suitable components from among many proven contemporary designs and compactly interfacing them in buoy system 10 can be readily done without requiring anything beyond ordinary skill.

The disclosed components and their arrangements as disclosed herein all contribute to the novel features of this invention. Buoy system 10 as described herein provides a cost-effective means of bidirectionally transferring information across the air-water interface for long term reliable operation in harsh marine environments. Therefore, buoy system 10 as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A buoy system for bi-directional communications in air and underwater comprising:
    a buoy having a hollow shell on water, said shell having an upper portion to project in air above the surface of water and a lower portion to extend below the surface of said water;
    an array of acoustic transducers in said lower portion for receiving acoustic signals in the passive mode and for transmitting acoustic signals in the active mode through said water; and
    a retro-reflective coating on said upper portion, said retro-reflective coating being dome-shaped and vibrated in accordance with data signals for retro-reflecting impinging laser illumination signals and conveying said data signals as retro-reflected data signals, and said retro-reflective coating being vibrated in response to impinging laser control and information signals at said buoy.

2. The system of claim 1 further comprising:
    an array of photo-detectors on said upper portion responsive to said impinging laser control and information signals for generating activation signals.

3. The system of claim 2 further comprising:
    a control/memory module, optical processing module, and acoustic processing-electronics section in said hollow shell for receiving said activation signals, said control/memory module and acoustic processing-electronics section coupling received acoustic signals from said transducer array and from memory as said data signals to said retro-reflective coating.

4. The system of claim 3 further comprising:
    a GPS in said control/memory module for covert identification of position of said buoy, said GPS being connected to an antenna on said shell to receive GPS coordinates and, optionally, relay the position of said buoy.

5. The system of claim 4 further comprising:
    an array of electromechanical vibration shakers inside of and against said upper portion of said hollow shell, said vibration shaker array being driven by said optical processing module for vibrating said retro-reflective coating.

6. The system of claim 5 further comprising:
    an annular array of accelerometers being connected to said optical processing module for measuring the three dimensional displacements of said retro-reflective coating to provide signals representative of accelerations during said displacements.

7. The system of claim 6 further comprising:
    transducer elements interspersed with said vibration shaker array under said dome-shaped retro-reflective coating, said transducer elements being connected to said optical processing module for generating signals representative of said impinging laser control and information signals.

8. The system of claim 7 wherein said representative generated signals from said transducer elements are coupled to said control/memory module to initiate retrieval of the information of received acoustic signals from said transducer array and memory in said control/memory module.

9. The system of claim 8 further comprising:
    a transmit/receive switch connected to said control/memory module, said acoustic processing-electronics section, and said transducer array to selectively enable operation of said transducer array in the passive mode and the active mode.

10. The system of claim 9 further comprising:
    an acoustically transparent cover on said lower portion of said shell over said transducer array;
    a power supply in said shell for supplying electrical power for all components therein; and
    ballast chambers in said shell for maintaining buoyancy and proper vertical orientation of said shell.

11. The system of claim 10 further comprising:
    a remote platform having at least one laser onboard for transmitting said impinging laser illumination signals and impinging laser control signals through said air, and a laser Doppler vibrometer-based sensor responsive to receive said data signals as said retro-reflected data signals through said air.

12. The system of claim 11 wherein said system assures covert bi-directional communications with said illuminating and retro-reflected laser signals in said air to initiate control including acoustic transmission of acoustic signals in said water, acoustic reception of acoustic signals in said water, and optical transmission of data of said received acoustic signals in said air by said retro-reflected laser signals.

* * * * *